(12) United States Patent
Chen (10) Patent No.: US 11,902,030 B2
(45) Date of Patent: *Feb. 13, 2024

(54) CONFIGURATION FOR DUPLICATION TRANSMISSION AND DUPLICATION TRANSMISSION METHOD AND DEVICE

(71) Applicant: Datang Mobile Communications Equipment Co., Ltd., Beijing (CN)

(72) Inventor: Li Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/957,528

(22) Filed: Sep. 30, 2022

(65) Prior Publication Data

US 2023/0027169 A1 Jan. 26, 2023

Related U.S. Application Data

(63) Continuation of application No. 16/622,834, filed as application No. PCT/CN2018/081165 on Mar. 29, 2018, now Pat. No. 11,539,474.

(30) Foreign Application Priority Data

Jun. 15, 2017 (CN) .......................... 201710453584.1

(51) Int. Cl.
*H04L 1/1829* (2023.01)
*H04L 1/1867* (2023.01)
(Continued)

(52) U.S. Cl.
CPC ............ *H04L 1/1858* (2013.01); *H04L 1/189* (2013.01); *H04W 76/11* (2018.02); *H04W 76/27* (2018.02); *H04W 80/02* (2013.01)

(58) Field of Classification Search
CPC ..... H04W 76/11; H04W 76/27; H04W 80/02; H04L 1/1858; H04L 1/189
(Continued)

(56) References Cited

U.S. PATENT DOCUMENTS

2015/0215987 A1 7/2015 Kim et al.

FOREIGN PATENT DOCUMENTS

| CN | 101814980 A | 8/2010 |
| CN | 102123487 A | 7/2011 |

(Continued)

OTHER PUBLICATIONS

CATT, "Configuration and activation/deactivation of duplication," 3GPP TSG-RAN WG2 Meeting #98, R2-1704247, Hangzhou, China, May 15-19, 2017.

(Continued)

*Primary Examiner* — Intekhaab A Siddiquee
(74) *Attorney, Agent, or Firm* — Foley & Lardner LLP (57) ABSTRACT

Disclosed by the present application are a configuration for duplication transmission and a duplication transmission method and device, comprising: determining each radio bearer of a terminal; and carrying out duplication transmission configuration for each radio bearer. The terminal receives the configuration for duplication transmission carried out at a network side and carries out duplication transmission according to the configuration. By employing the present application, duplication transmission may be applied flexibly for different bearer characteristics, high reliability provided by duplication transmission may be obtained, the utilization efficiency of radio resources may be increased, and resource waste is avoided. Meanwhile, air interface control signaling overhead is reduced.

20 Claims, 4 Drawing Sheets

Receiving, by a terminal, the configuration for duplication transmission performed at the network side, where the configuration is performed at the network side for each radio bearer of the terminal — 701

Performing the duplication transmission according to the configuration — 702

(51) Int. Cl.
    *H04W 76/11* (2018.01)
    *H04W 76/27* (2018.01)
    *H04W 80/02* (2009.01)

(58) Field of Classification Search
    USPC ........................................................ 370/329
    See application file for complete search history.

(56) References Cited

FOREIGN PATENT DOCUMENTS

| | | |
|---|---|---|
| CN | 103825671 A | 5/2014 |
| CN | 107342851 A | 11/2017 |
| EP | 3 297 382 A1 | 3/2018 |
| EP | 3 589 009 A1 | 1/2020 |
| EP | 3 606 274 A1 | 2/2020 |

OTHER PUBLICATIONS

CATT, "PDCP Duplication," 3GPP TSG-RAN WG2 Meeting #97bis, R2-1703114, Spokane, USA, Apr. 3-7, 2017.

ESTI MCC, Report of 3GPP TSG RAN2 #98 meeting, Hangzhou, China, Draft Report of 3GPP TSG-RAN WG2 meeting #98, Jun. 9, 2017, pp. 151-153, Draft_RAN2#98_Meeting_Report_v1.zip, URL: https://list.etsi.org/scripts/wa.exe?A2=ind1706B&L=3GPP_TSG_RAN_WG2&O=D&P=81574.

Extended European Search Report for EP Appl. No. 18817994.9, dated May 25, 2020.

Huawei et al.: "Dynamic activation/deactivation of packet duplication" 3GPP TSG-RAN2 #98; R2-1704835; May 19, 2017; Hangzhou, China (2 pages).

Nokia et al: "Duplication Impacts to MAC" 3GPP TSG-RAN WG2 Meeting #98, May 15-19, 2017, 3 Pages, R2-1704272, Hangzhou, China.

Samsung: "NR MAC header fields" 3GPP TSG-RAN WG2 Meeting #98; R2-1705680; May 19, 2017; Hangzhou, China (3 pages).

VIVO: "Duplication data in CA", 3GPP TSG-RAN WG2 Meeting #98; R2-1704578, vol. RAN WG2, No. Hangzhou, China; May 15-19, 2017 May 6, 2017 URL:http://www.3gpp.org/ftp/tsg_ran/WG2_RL2/TSGR2_98/Docs/.

ZTE, "Consideration on activation/deactivation of data duplication for CA", 3GPP TSG-RAN WG2 Meeting #98; R2-1704660; May 19, 2017, Hangzhou, China, URL: http://www.3gpp.org/ftp/tsg_ran/WG2_RL2/TSGR2_98/Docs/R2-1704660.zip>.

CONFIGURATION FOR DUPLICATION TRANSMISSION AND DUPLICATION TRANSMISSION METHOD AND DEVICE

The present application is a continuation of U.S. patent application Ser. No. 16/622,834, filed on Dec. 13, 2019, which is a national stage of International Application No. PCT/CN2018/081165, filed on Mar. 29, 2018, claiming priority to Chinese Patent Application No. 201710453584.1, filed with the Chinese Patent Office on Jun. 15, 2017, the content of which is hereby incorporated by reference in its entirety.

FIELD

The present application relates to the field of wireless communication technologies, and particularly to a configuration for duplication transmission and a duplication transmission method and device.

BACKGROUND

The 5G NR (next generation Radio) system mainly supports three types of services: eMBB (enhanced Mobile Broadband), mMTC (massive Machine Type Communications), and URLLC (Ultra-Reliable and Low Latency Communications).

For the URLLC, since it has the higher requirements on both the latency and the reliability, one solution provided now by the 3GPP (3rd Generation Partnership Project) is to introduce the duplication transmission mechanism, that is, the same PDU (Protocol Data Unit) of the PDCP (Packet Data Convergence Protocol) layer is transmitted via a plurality of paths, to increase the transmission reliability and lower the transmission latency through the multipath transmission gain.

Figure 1:
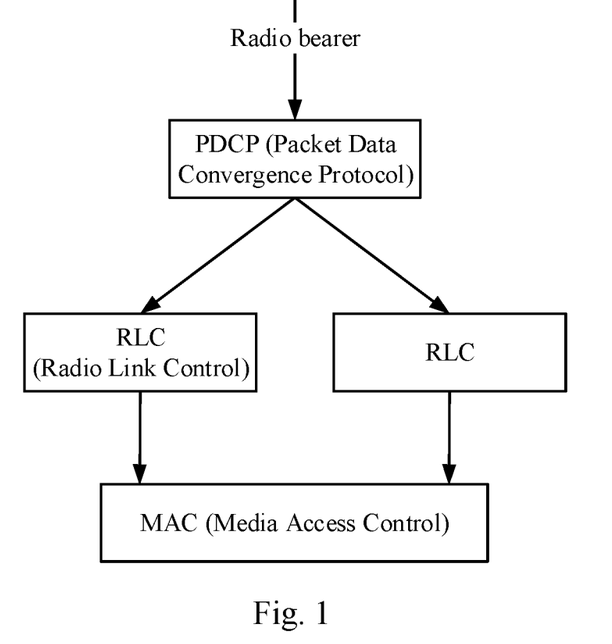
FIG. 1 is a schematic diagram of the duplication transmission model under the CA in the Background part.
Figure 2:
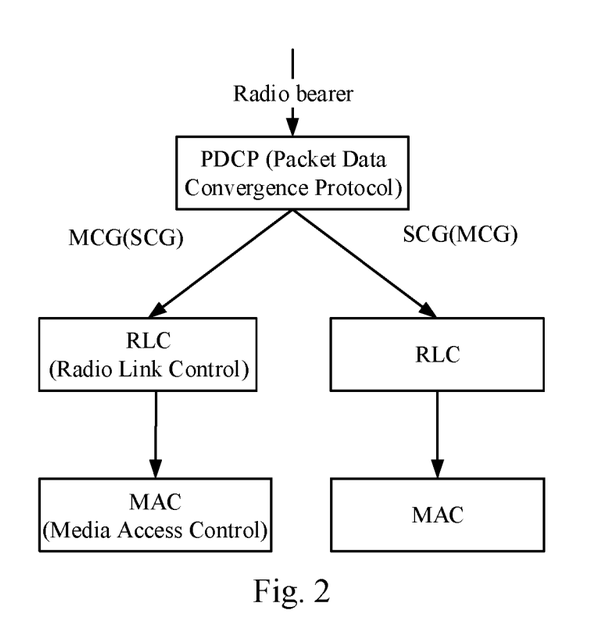
FIG. 2 is a schematic diagram of the duplication transmission model under the DC in the Background part.

FIG. 1 is a schematic diagram of the duplication transmission model under the CA (Carrier Aggregation), and FIG. 2 is a schematic diagram of the duplication transmission model under the DC (Dual Connectivity). The duplication transmission models under the CA and DC are as shown in FIGS. 1 and 2, that is, one radio bearer (corresponding to one PDCP entity) of the PDCP layer is transmitted via a plurality of logical channels (each logical channel corresponding to one RLC (Radio Link Control) entity) in the RLC layer respectively. For the CA model, the plurality of logical channels corresponding to the radio bearer for the duplication transmission are processed by one MAC (Media Access Control) entity in the MAC layer, and the data from different RLC logical channels is mapped to different radio resources on one carrier or to different carriers respectively for the transmission. For the DC model, the plurality of logical channels corresponding to the duplication RB (duplication Radio Bearer) are mapped to different MAC entities respectively, and naturally the data from the plurality of different RLC logical channels may be mapped to different radio resources or carriers respectively for the transmission.

The duplication transmission is for the purpose of ensuring the reliable data transmission, but if the duplication transmission is employed for all the data, the radio resources may be wasted greatly. Thus, there is a need to introduce the effective control mechanism for the duplication transmission, i.e., increasing the resource utilization rate while ensuring the reliability of the particular service. Meanwhile there is also a need to consider saving the control signalling overhead.

The duplication transmission mechanism is introduced due to the URLLC, and also applicable to other services. The duplication transmission mechanism needs to be applied reasonably, but the deficiency in the prior art is that there is no good solution at present.

SUMMARY

The present application provides a configuration for duplication transmission and a duplication transmission method and device so as to provide a reasonable duplication transmission mechanism in the multi-service case.

In a first aspect, an embodiment of the present application provides a configuration method of duplication transmission, the method includes: determining each radio bearer of a terminal; and performing a duplication transmission configuration for each radio bearer.

In an implementation, the duplication transmission configuration is performed for each radio bearer using an RRC signalling.

In an implementation, the duplication transmission configuration performed for each radio bearer includes one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, configuring initial states of the two logical channels as whether to be in an activated state immediately after the configuration; for uplink transmission, a configuration as to whether to allow to activate or deactivate the duplication transmission.

In an implementation, the duplication transmission of the radio bearer is activated or deactivated using an MAC layer signalling.

In an implementation, the MAC layer signalling for activation or deactivation is an independent MAC subheader without MAC layer load.

In an implementation, a field in the MAC subheader is used to indicate that an MAC CE is used to activate or deactivate the duplication transmission.

In an implementation, an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

In a second aspect, an embodiment of the present application provides a duplication transmission method, the method includes: receiving, by a terminal, a configuration for duplication transmission performed at a network side, wherein the configuration is performed at the network side for each radio bearer of the terminal; and performing the duplication transmission according to the configuration.

In an implementation, the terminal receives an RRC signalling from the network side and determines the configuration for duplication transmission.

In an implementation, the configuration for duplication transmission includes one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, initial states configured for the two logical channels being whether to be in an activated state immediately after the configuration; for uplink transmission, a configuration for the radio bearer being whether to allow to activate or deactivate the duplication transmission.

In an implementation, the terminal receives an MAC layer signalling for activating or deactivating the duplication transmission from the network side.

In an implementation, the MAC layer signalling for activation or deactivation is an independent MAC subheader without MAC layer load.

In an implementation, a field in the MAC subheader is used to indicate that an MAC CE is used to activate or deactivate the duplication transmission.

In an implementation, an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

In a third aspect, an embodiment of the present application provides a configuration device of duplication transmission, the device includes: a determining module configured to determine each radio bearer of a terminal; and a configuring module configured to perform a duplication transmission configuration for each radio bearer.

In an implementation, the configuring module is further configured to perform the duplication transmission configuration for each radio bearer using an RRC signalling.

In an implementation, the configuring module is further configured to perform, for each radio bearer, the duplication transmission configuration including one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, configuring initial states of the two logical channels as whether to be in an activated state immediately after the configuration; for uplink transmission, a configuration as to whether to allow to activate or deactivate the duplication transmission.

In an implementation, the configuring module is further configured to activate or deactivate the duplication transmission of the radio bearer using an MAC layer signalling.

In an implementation, the configuring module is further configured to use the MAC layer signalling that is an independent MAC subheader without MAC layer load for activation or deactivation.

In an implementation, the configuring module is further configured to use a field in the MAC subheader to indicate that an MAC CE is used to activate or deactivate the duplication transmission.

In an implementation, the configuring module is further configured to use an LCID field in the MAC subheader to indicate that the MAC CE is used to activate or deactivate the duplication transmission, and use another field to indicate whether to activate or deactivate, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or, to use an LCID field in the MAC subheader to indicate that the MAC CE is used to activate or deactivate the duplication transmission, wherein two LCID values are used to indicate an MAC CE for activating the duplication transmission and an MAC CE for deactivating the duplication transmission respectively.

In a fourth aspect, an embodiment of the present application provides a duplication transmission device, the device includes: a receiving module configured to receive a configuration for duplication transmission performed at a network side, wherein the configuration is performed at the network side for each radio bearer of a terminal; and a transmission module configured to perform the duplication transmission according to the configuration.

In an implementation, the receiving module is further configured to receive an RRC signalling from the network side and determine the configuration for duplication transmission.

In an implementation, the configuration for duplication transmission includes one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, initial states configured for the two logical channels being whether to be in an activated state immediately after the configuration; for uplink transmission, a configuration for the radio bearer being whether to allow to activate or deactivate the duplication transmission.

In an implementation, the receiving module is further configured to receive an MAC layer signalling for activating or deactivating the duplication transmission from the network side.

In an implementation, the receiving module is further configured to receive the MAC layer signalling that is an independent MAC subheader without MAC layer load for activation or deactivation.

In an implementation, a field in the MAC subheader is used to indicate that an MAC CE is used to activate or deactivate the duplication transmission.

In an implementation, an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

In a fifth aspect, an embodiment of the present application provides a configuration device of duplication transmission, the device includes: a processor configured to read a program in a memory to perform a process of: determining each radio bearer of a terminal; a transceiver configured to receive and transmit data under the control of the processor to perform a process of: performing a duplication transmission configuration for each radio bearer.

In an implementation, the processor is further configured to perform the duplication transmission configuration for each radio bearer using an RRC signalling.

In an implementation, the processor is further configured to perform, for each radio bearer, the duplication transmission configuration including one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, configuring initial states of the two logical channels as whether to be in an activated state immediately after the configuration; for uplink transmission, a configuration as to whether to allow to activate or deactivate the duplication transmission.

In an implementation, the processor is further configured to activate or deactivate the duplication transmission of the radio bearer using an MAC layer signalling.

In an implementation, the processor is further configured to use the MAC layer signalling that is an independent MAC subheader without MAC layer load for activation or deactivation.

In an implementation, the processor is further configured to use a field in the MAC subheader to indicate that an MAC CE is used to activate or deactivate the duplication transmission.

In an implementation, the processor is further configured to use an LCID field in the MAC subheader to indicate that the MAC CE is used to activate or deactivate the duplication transmission, and use another field to indicate whether to activate or deactivate, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or, to use an LCID field in the MAC subheader to indicate that the MAC CE is used to activate or deactivate the duplication transmission, wherein two LCID values are used to indicate an MAC CE for activating the duplication transmission and an MAC CE for deactivating the duplication transmission respectively.

In a sixth aspect, an embodiment of the present application provides a duplication transmission device, the device includes: a processor configured to read a program in a memory to perform a process of: processing data according to a transceiver requirement; a transceiver configured to receive and transmit data under the control of the processor to perform the processes of: receiving a configuration for duplication transmission performed at a network side, wherein the configuration is performed at the network side for each radio bearer of a terminal; performing the duplication transmission according to the configuration.

In an implementation, the processor is further configured to receive an RRC signalling from the network side and determine the configuration for duplication transmission.

In an implementation, the configuration for duplication transmission includes one or a combination of: a Radio Bearer Identity, RB ID, and a configuration of a PDCP entity corresponding to the bearer; two corresponding Logical Channel Identity, LCID, used by the radio bearer for the duplication transmission, and configurations of RLC entities corresponding to the two logical channels respectively; for uplink transmission, initial states configured for the two logical channels being whether to be in an activated state immediately after the configuration; for uplink transmission, a configuration for the radio bearer being whether to allow to activate or deactivate the duplication transmission.

In an implementation, the processor is further configured to receive an MAC layer signalling for activating or deactivating the duplication transmission from the network side.

In an implementation, the processor is further configured to receive the MAC layer signalling that is an independent MAC subheader without MAC layer load for activation or deactivation.

In an implementation, a field in the MAC subheader is used to indicate that an MAC CE is used to activate or deactivate the duplication transmission.

In an implementation, an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

In a seventh aspect, a readable storage medium of a cache synchronization exception device provided by an embodiment of the present application includes the program codes which are configured, when running on a computing device, to cause the computing device to perform the steps of any one of the methods of the first aspect described above or the steps of any one of the methods of the second aspect described above.

The present application has the following beneficial effects.

In the technical solutions provided by embodiments of the present application, since the duplication transmission configuration is performed for each radio bearer, the duplication transmission can be applied flexibly for different bearer characteristics, and the utilization efficiency of the radio resources can be increased to avoid the resource waste while the high reliability caused by the duplication transmission is obtained. Meanwhile the control signalling overhead of the air interface is also saved.

BRIEF DESCRIPTION OF THE DRAWINGS

The accompanying drawings illustrated here are used to provide the further understanding of the present application and constitute a part of the present application, and the schematic embodiments of the present application and the illustration thereof are used to explain the present application but not limit the present application improperly.

DETAILED DESCRIPTION

In order to support the requirement of the service transmission with low latency and high reliability, the 5G NR introduces the duplication transmission mechanism. The duplication transmission mechanism can be applied to any type of service, but different services have different latency and reliability requirements. Embodiments of the present application will provide a solution applying the duplication transmission effectively, which ensures that the duplication transmission is performed only for the necessary service and is performed only when necessary, ensures that the air interface resources is utilized reasonably and effectively while enhancing the transmission reliability of the particular service and lowering the transmission latency, and also reduces the signalling overhead of the duplication transmission control. Specific embodiments of the present application will be illustrated below in combination with the drawings.

Figure 3:
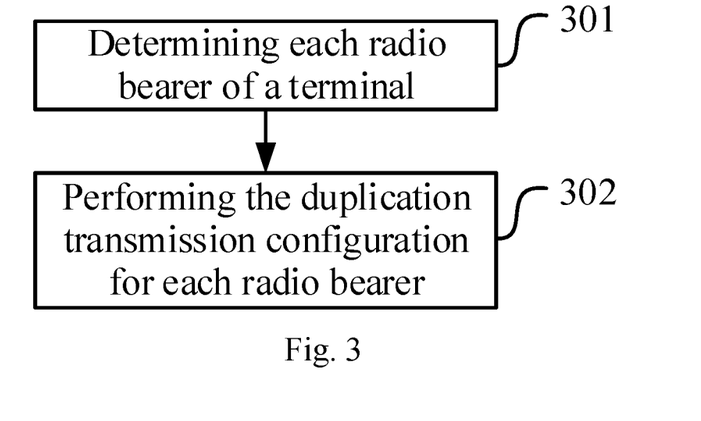
FIG. 3 is a schematic diagram of an implementation process of a configuration method of duplication transmission in an embodiment of the present application.

FIG. 3 is a schematic diagram of an implementation process of a configuration method of duplication transmission, and as shown, the method can include following steps.

Step 301: determining each radio bearer of a terminal.

Step 302: performing the duplication transmission configuration for each radio bearer.

Specifically, the duplication transmission (duplication) configuration is performed at the network side for each radio bearer of the terminal. The configuration content includes the initial state of the duplication transmission, whether to allow to activate or deactivate, and others.

Here the duplication transmission configuration employs the RRC signalling, and the activation or deactivation employs the MAC layer signalling (i.e., MAC CE). That is, in an implementation, the duplication transmission configuration can be performed for each radio bearer using the RRC signalling. The duplication transmission configuration of the radio bearer can be activated or deactivated using the MAC layer signalling.

Thus, through the duplication transmission configuration, the duplication transmission services of the terminal may include three types: the initial state is activated, and the activation or deactivation may be performed by the underlying signalling (MAC CE, MAC control element); the initial state is deactivated, and the activation or deactivation may be performed by the underlying signalling (MAC CE, MAC control element); the initial state is activated, and once being configured, the duplication transmission remains activated, and the underlayer is not allowed to activate or deactivate the duplication transmission.

The further illustration is as follows.

In an implementation, the duplication transmission configuration performed for each radio bearer includes one or a combination of: RB ID, and the configuration of the PDCP entity corresponding to the bearer; two corresponding LCID used by the radio bearer for the duplication transmission, and the configurations of the RLC entities corresponding to the two logical channels respectively; for uplink transmission, configuring the initial state of two logical channels as whether to be in the activated state immediately after the configuration; for uplink transmission, the configuration as to whether to allow to activate or deactivate the duplication transmission.

In a specific implementation, in the RRC signalling for the duplication transmission configuration which is performed for each radio bearer, the signalling content can include: 1. RB ID (identity), and the configuration of the PDCP entity corresponding to the bearer; 2. two LCIDs (Logical Channel IDs) corresponding to the bearer, and the configurations of the RLC entities corresponding to the two logical channels respectively; 3. for the downlink transmission, the base station only needs to configure the radio bearer and two corresponding logical channels, and whether to activate or deactivate the duplication transmission is the action implemented at the base station side without other signallings and operations; 4. for the uplink transmission, the RRC signalling can further include: the initial states of two logical channels, that is, whether the corresponding logical channel is in the activated state immediately after being configured, which can be classified as: one logical channel is initially configured to be in the non-activated state, or two logical channels are both initially configured to be in the activated state; 5. for the uplink transmission, the RRC signalling can further include: whether to allow to activate or deactivate the duplication configuration, where this option can be configured for two logical channels respectively or can be configured for the radio bearer and this option is optional.

If some logical channel of the radio bearer is in the non-activated state after being configured, the option of "whether to allow to activate or deactivate the duplication configuration" may not appear, and the radio bearer allows to activate or deactivate the duplication configuration by using the MAC layer signalling, i.e., allows to activate the logical channel with the initial state being non-activated after being configured by using the MAC layer signalling, and also to deactivate the duplication transmission subsequently by using the MAC layer signalling.

If two logical channels of the radio bearer are both in the activated state after being configured, the option of "whether to allow to activate or deactivate the duplication configuration" is used to indicate whether some logical channel is allowed to be deactivated. If this option does not appear, it can be understood that neither of the two logical channels of the radio bearer is allowed to be deactivated, that is, the duplication transmission mechanism is continuously effective after being configured.

In an implementation, the duplication transmission of the radio bearer can be activated or deactivated using the MAC layer signalling.

In a specific implementation, the MAC layer signalling for activation or deactivation is an independent MAC subheader without MAC layer load.

In a specific implementation, the field in the MAC subheader is used to indicate that the MAC CE is used to activate or deactivate the duplication transmission.

In a specific implementation, the LCID field in the MAC subheader is used to indicate that the MAC CE is used to activate or deactivate the duplication transmission, and another field indicates whether to activate or deactivate specifically, where one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission.

Alternatively, the LCID field in the MAC subheader is used to indicate that the MAC CE is used to activate or deactivate the duplication transmission, where two LCID values are used to indicate the MAC CE for activating the duplication transmission and the MAC CE for deactivating the duplication transmission respectively.

Specifically, the format of the MAC command for activating or deactivating is an independent MAC subheader without MAC layer load (payload). The field in the MAC subheader is used to indicate that the MAC CE (Control Element) is used to activate or deactivate the duplication transmission. The command for activating or deactivating the duplication transmission is only for the uplink transmission and is sent by the base station to the terminal. The MAC command (i.e., MAC CE) used in an implementation includes only one MAC subheader, saving the signalling overhead of the MAC layer greatly.

Specifically, there are two ways as follows.

Figure 4:
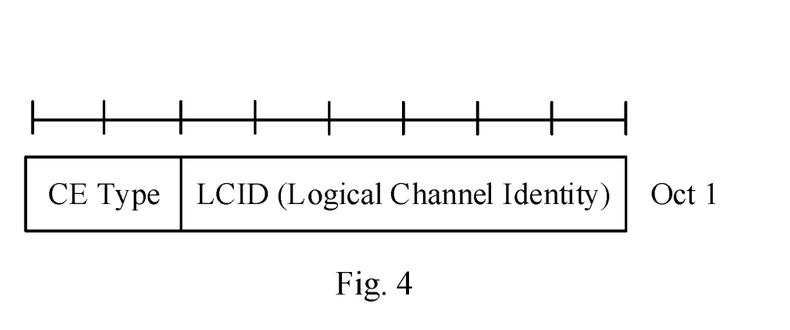
FIG. 4 is a schematic diagram where the CE Type in the first format of MAC command for activating or deactivating the duplication transmission occupies 1 bit in an embodiment of the present application.
Figure 5:
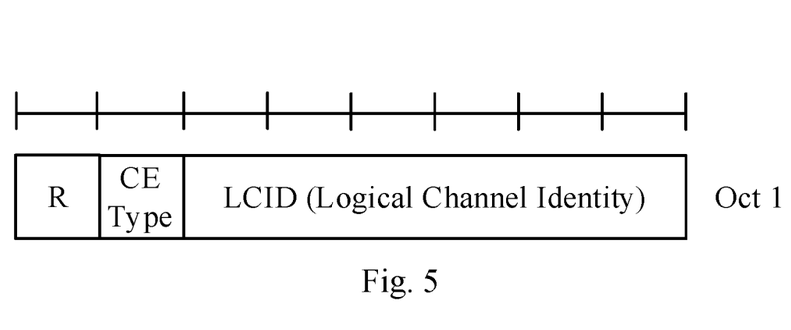
FIG. 5 is a schematic diagram where the CE Type in the first format of MAC command for activating or deactivating the duplication transmission occupies 2 bits in an embodiment of the present application.

1. FIG. 4 is a schematic diagram where the CE Type in the first format of MAC command for activating or deactivating the duplication transmission occupies 1 bit, and FIG. 5 is a schematic diagram where the CE Type in the first format of MAC command for activating or deactivating the duplication transmission occupies 2 bits. One LCID is used to indicate that the MAC CE is used to activate or deactivate the duplication transmission, and another field indicates whether to activate or deactivate specifically. The schematic diagrams where the CE Type occupies 1 bit and 2 bits respectively are as shown in FIGS. 4 and 5, in which LCID=activate or deactivate the duplication transmission, and CE Type=activate or CE Type=deactivate.

Figure 6:
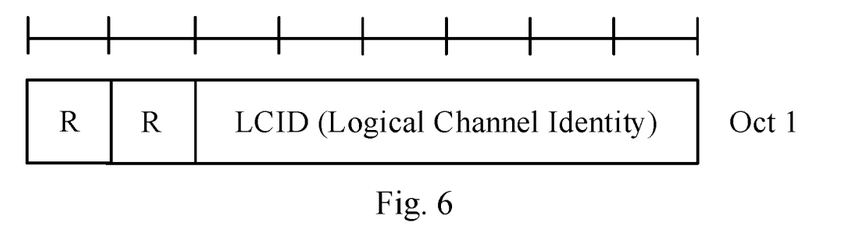
FIG. 6 is a schematic diagram of the second format of MAC command for activating or deactivating the duplication transmission in an embodiment of the present application.

2. FIG. 6 is a schematic diagram of the second format of MAC command for activating or deactivating the duplication transmission, and as shown, two LCIDs are used to indicate that the MAC CE is used to activate or deactivate the duplication transmission respectively. LCID1=activate the duplication transmission, and LCID2=deactivate the duplication transmission.

Accordingly, for the terminal side, the process can be implemented as follows.

Figure 7:
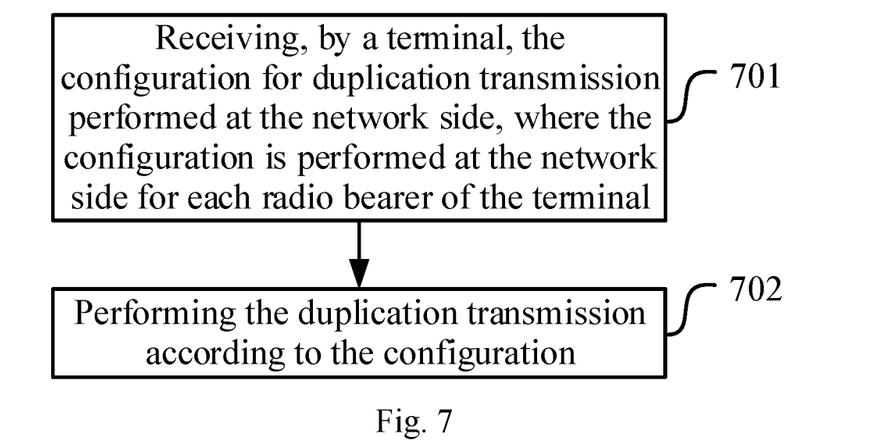
FIG. 7 is a schematic diagram of an implementation process of a duplication transmission method in an embodiment of the present application.

FIG. 7 is a schematic diagram of an implementation process of a duplication transmission method, and as shown, the method can include following steps.

Step 701: receiving, by a terminal, the configuration for duplication transmission performed at the network side, where the configuration is performed at the network side for each radio bearer of the terminal.

Step 702: performing the duplication transmission according to the configuration.

In an implementation, the terminal receives the RRC signalling from the network side and determines the configuration for duplication transmission.

In an implementation, the configuration for duplication transmission includes one or a combination of: RB ID, and the configuration of the PDCP entity corresponding to the bearer; two corresponding Logical Channel Identity, LCID, used by the radio bearer for the duplication transmission, and the configurations of the RLC entities corresponding to the two logical channels respectively; for uplink transmission, the initial state configured for the two logical channels is whether to be in the activated state immediately after the configuration; for uplink transmission, the configuration for the radio bearer is whether to allow to activate or deactivate the duplication transmission.

In an implementation, the terminal receives the MAC layer signalling for activating or deactivating the duplication transmission from the network side.

In an implementation, the MAC layer signalling for activation or deactivation is an independent MAC subheader without MAC layer load.

In an implementation, the field in the MAC subheader is used to indicate that the MAC CE is used to activate or deactivate the duplication transmission.

In an implementation, the LCID field in the MAC subheader is used to indicate that the MAC CE is used to activate or deactivate the duplication transmission, and another field indicates whether to activate or deactivate specifically, where one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission.

Alternatively, the LCID field in the MAC subheader is used to indicate that the MAC CE is used to activate or deactivate the duplication transmission, where two LCID values are used to indicate the MAC CE for activating the duplication transmission and the MAC CE for deactivating the duplication transmission respectively.

It will be illustrated below by way of examples.

First embodiment is as follows.

In this example, the duplication transmission of the radio bearer is effective all the time after the configuration.

Steps at the base station side are as follows.

First step: the duplication transmission configuration is performed using the RRC signalling for the radio bearer of the terminal, where the radio bearer may be Signalling Radio Bearer (SRB) or Data Radio Bearer (DRB), the transmission direction of the radio bearer may be uplink or downlink, the configuration signalling of the duplication transmission indicates two logical channels for the duplication transmission corresponding to the bearer, and the two logical channels are always in the activated state after being configured, i.e., cannot be deactivated.

Second step: for the downlink transmission, the base station performs the duplication transmission on two logical channels configured for the radio bearer; and for the uplink transmission, the base station performs the uplink resource allocation on the two logical channels configured for the radio bearer, and schedules the terminal to perform the uplink duplication transmission.

Steps at the terminal side are as follows.

First step: the terminal receives the RRC configuration command sent by the base station, and determines the duplication transmission configuration, i.e., the radio bearer and its corresponding logical channels as well as other specific configurations. It is determined that two logical channels for the duplication transmission configured for the radio bearer are always in the activated state, i.e., can be used all the time and cannot be deactivated.

Second step: for the downlink transmission, the terminal receives the downlink transmission on two logical channels configured for the radio bearer; and for the uplink transmission, the terminal receives the scheduling command sent by the base station, where the traffic data on the two logical channels configured for the duplication transmission is contained in the uplink transmission.

Second embodiment is as follows.

In this example, the duplication transmission function can be activated or deactivated after the duplication transmission configuration of the radio bearer (only for the uplink transmission).

Steps at the base station side are as follows.

First step: the duplication transmission configuration is performed using the RRC signalling for the radio bearer of the terminal, where the configuration signalling of the duplication transmission indicates two uplink logical channels for the duplication transmission corresponding to the bearer. The configuration signalling contains: the initial states of the uplink logical channels, that is, the transmission state is activated or non-activated; the duplication transmission of the bearer can be activated or deactivated using the MAC signalling.

Second step: the base station performs the uplink resource schedule for the terminal.

Third step: the base station sends the MAC signalling to the terminal to indicate the activation or deactivation of the logical channels for the duplication transmission when the current duplication transmission state needs to be changed.

Steps at the terminal side are as follows.

First step: the terminal receives the RRC configuration command sent by the base station, and determines the duplication transmission configuration, i.e., the radio bearer and its corresponding logical channels as well as other specific configurations. The initial states of two logical channels for the duplication transmission configured for the radio bearer are determined, and the bearer allows to activate or deactivate the duplication transmission.

Second step: the terminal receives the scheduling command sent by the base station, and sends the traffic data on the activated logical channels on the allocated uplink resources.

Third step: the terminal receives the MAC layer command for activating or deactivating the duplication transmission sent by the base station, and determines the activation or deactivation of the particular logical channels. The specific process can be as follows.

If the duplication transmission is not activated, that is, only one logical channel is now activated for the radio bearer, the terminal activates the other logical channel configured for the radio bearer after receiving the MAC layer command for activating the duplication transmission, and the two logical channels send the traffic data of the same RB simultaneously to perform the duplication transmission.

If the duplication transmission has been activated, that is, two logical channels are now activated for the radio bearer and used for the duplication transmission, the terminal deactivates one logical channel after receiving the MAC layer command for deactivating the duplication transmission and uses only one logical channel to transmit the data of the radio bearer, which is specifically as follows.

(1) For the CA, the default logical channel (or main logical channel) is retained and the other logical channel is deactivated, where the default logical channel is configured in the RRC signalling or the default logical channel is the logical channel configured initially to be activated, and the other logical channel is the logical channel configured initially to be non-activated.

(2) For the DC, one of the following approaches can be employed.

Like the CA, the default logical channel (or main logical channel) is retained and the other logical channel is deactivated. The default logical channel is configured in the RRC signalling or the default logical channel is the logical channel configured initially to be activated, and the other logical channel is the logical channel configured initially to be non-activated.

Alternatively, for the DC, each of the MCG (Master Cell Group) and SCG (Secondary Cell Group) has an independent MAC entity, and if the MAC command is sent from the MAC entity corresponding to one logical channel, the corresponding logical channel is deactivated. For example, if the MAC command for deactivating is sent from the MCG, the logical channel corresponding to the bearer on the MCG is deactivated.

Third embodiment is as follows.

In this example, the duplication transmission is configured for two radio bearers, where the duplication transmission is continuously effective for one radio bearer, and the duplication transmission can be activated or deactivated for the other radio bearer (uplink transmission).

Steps at the base station side are as follows.

First step: the base station configures two radio bearers for the terminal, where the duplication transmission of the RB1 is always activated and the duplication transmission of the RB2 can be activated or deactivated using the MAC signalling.

Second step: the base station sends the MAC command for activating or deactivating the duplication transmission to the terminal when the duplication transmission state of the RB2 needs to be changed. This MAC command is directed to the terminal, but takes effect only for the RB2 but not for the RB1.

Steps at the terminal side are as follows.

First step: the terminal receives the configuration from the base station and determines two radio bearers configured with the duplication transmission, initial states of the two radio bearers and whether to allow the activation or deactivation for the two radio bearers, where the duplication transmission of the RB1 is always activated and the duplication transmission of the RB2 can be activated or deactivated using the MAC signalling.

Second step: the terminal updates the duplication transmission state only for the RB2 after receiving the MAC command for activating or deactivating the duplication transmission sent by the base station, where the duplication transmission of the RB1 is activated all the time.

Based upon the same inventive concept, embodiments of the present application further provide a configuration device of duplication transmission and a duplication transmission device. Since the principles solving the problem of these devices are similar to the configuration method of duplication transmission and the duplication transmission method, the implementations of these devices can refer to the implementations of the methods, and the repeated description thereof will be omitted here.

Figure 8:
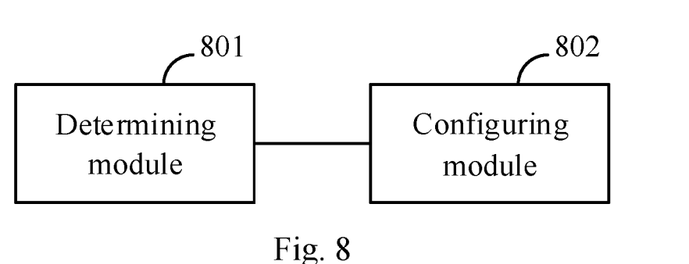
FIG. 8 is a structural schematic diagram of a configuration device of duplication transmission at the network side in an embodiment of the present application.

FIG. 8 is a structural schematic diagram of a configuration device of duplication transmission at the network side, and as shown, the device can include: a determining module 801 configured to determine each radio bearer of a terminal; and a configuring module 802 configured to perform the duplication transmission configuration for each radio bearer.

In an implementation, the configuring module is further configured to perform the duplication transmission configuration for each radio bearer using the RRC signalling.

In an implementation, the configuring module is further configured to perform, for each radio bearer, the duplication transmission configuration including one or a combination of: RB ID, and the configuration of the PDCP entity corresponding to the bearer; two corresponding Logical Channel Identity, LCID, used by the radio bearer for the duplication transmission, and the configurations of the RLC entities corresponding to the two logical channels respectively; for uplink transmission, configuring the initial states of the two logical channels as whether to be in the activated state immediately after the configuration; for uplink transmission, the configuration as to whether to allow to activate or deactivate the duplication transmission.

In an implementation, the configuring module is further configured to activate or deactivate the duplication transmission of the radio bearer using the MAC layer signalling.

In an implementation, the configuring module is further configured to use the MAC layer signalling that is an independent MAC subheader without MAC layer load for activation or deactivation.

In an implementation, the configuring module is further configured to use the field in the MAC subheader to indicate that the MAC CE is used to activate or deactivate the duplication transmission.

In an implementation, the configuring module is further configured to use the LCID field in the MAC subheader to indicate that the MAC CE is used to activate or deactivate the duplication transmission, and use another field to indicate whether to activate or deactivate, wherein one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission; or, to use the LCID field in the MAC subheader to indicate that the MAC CE is used to activate or deactivate the duplication transmission, wherein two LCID values are used to indicate the MAC CE for activating the duplication transmission and the MAC CE for deactivating the duplication transmission respectively.

Figure 9:
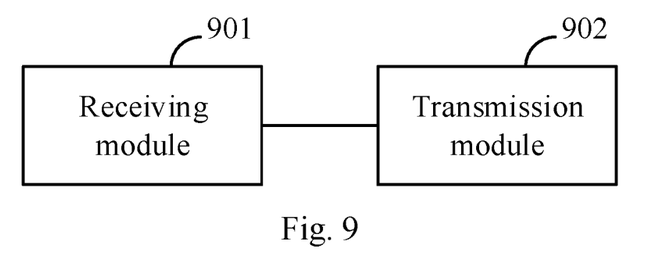
FIG. 9 is a structural schematic diagram of a duplication transmission device at the terminal side in an embodiment of the present application.

FIG. 9 is a structural schematic diagram of a duplication transmission device at the terminal side, and as shown, the device can include: a receiving module 901 configured to receive the configuration for duplication transmission performed at the network side, where the configuration is performed at the network side for each radio bearer of a terminal; and a transmission module 902 configured to perform the duplication transmission according to the configuration.

In an implementation, the receiving module is further configured to receive the RRC signalling from the network side and determine the configuration for duplication transmission.

In an implementation, the configuration for duplication transmission includes one or a combination of: RB ID, and the configuration of the PDCP entity corresponding to the bearer; two corresponding Logical Channel Identity, LCID, used by the radio bearer for the duplication transmission, and the configurations of the RLC entities corresponding to the two logical channels respectively; for uplink transmission, the initial states configured for the two logical channels being whether to be in the activated state immediately after the configuration; for uplink transmission, the configuration for the radio bearer being whether to allow to activate or deactivate the duplication transmission.

In an implementation, the receiving module is further configured to receive the MAC layer signalling for activating or deactivating the duplication transmission from the network side.

In an implementation, the receiving module is further configured to receive the MAC layer signalling that is an independent MAC subheader without MAC layer load for activation or deactivation.

In an implementation, the field in the MAC subheader is used to indicate that the MAC CE is used to activate or deactivate the duplication transmission.

In an implementation, the LCID field in the MAC subheader is used to indicate that the MAC CE is used to activate or deactivate the duplication transmission, and another field indicates whether to activate or deactivate specifically, wherein one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission; or the LCID field in the MAC subheader is used to indicate that the MAC CE is used to activate or deactivate the duplication transmission, wherein two LCID values are used to indicate the MAC CE for activating the duplication transmission and the MAC CE for deactivating the duplication transmission respectively.

For the sake of description, all the parts of the above-mentioned device are divided into various modules or units by function, which are described respectively. Of course, the functions of the various modules or units can be implemented in the same one or more software or hardware when the present application is implemented.

When the technical solution provided by embodiments of the present application is implemented, it can be implemented in such way as follows.

Figure 10:
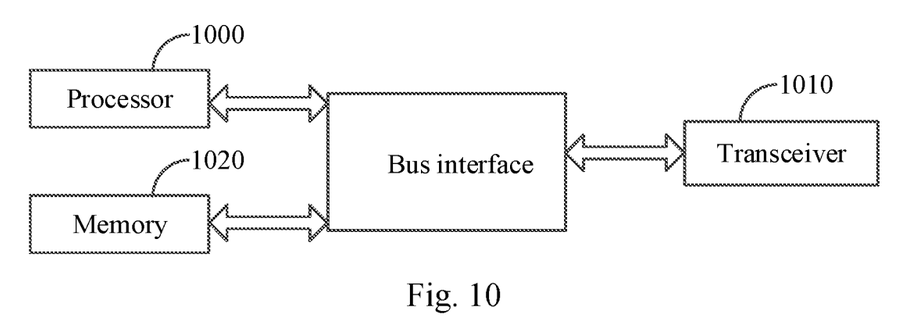
FIG. 10 is a structural schematic diagram of a base station in an embodiment of the present application.

FIG. 10 is a structural schematic diagram of a base station, and as shown, the base station includes: a processor 1000 configured to read the programs in a memory 1020 to perform the process of: determining each radio bearer of a terminal; a transceiver 1010 configured to receive and transmit the data under the control of the processor 1000 to perform the process of: performing the duplication transmission configuration for each radio bearer.

In an implementation, the duplication transmission configuration is performed for each radio bearer using the RRC signalling.

In an implementation, the duplication transmission configuration performed for each radio bearer includes one or a combination of: RB ID, and the configuration of the PDCP entity corresponding to the bearer; two corresponding Logical Channel Identity, LCID, used by the radio bearer for the duplication transmission, and the configurations of the RLC entities corresponding to the two logical channels respectively; for uplink transmission, configuring the initial states of the two logical channels as whether to be in the activated state immediately after the configuration; for uplink transmission, the configuration as to whether to allow to activate or deactivate the duplication transmission.

In an implementation, the duplication transmission of the radio bearer is activated or deactivated using the MAC layer signalling.

In an implementation, the MAC layer signalling for activation or deactivation is an independent MAC subheader without MAC layer load.

In an implementation, the field in the MAC subheader is used to indicate that the MAC CE is used to activate or deactivate the duplication transmission.

In an implementation, the LCID field in the MAC subheader is used to indicate that the MAC CE is used to activate or deactivate the duplication transmission, and another field indicates whether to activate or deactivate specifically, wherein one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission; or the LCID field in the MAC subheader is used to indicate that the MAC CE is used to activate or deactivate the duplication transmission, wherein two LCID values are used to indicate the MAC CE for activating the duplication transmission and the MAC CE for deactivating the duplication transmission respectively.

Here, in FIG. 10, the bus architecture can include any numbers of interconnected buses and bridges, and specifically link various circuits of one or more processors represented by the processor 1000 and the memory represented by the memory 1020. The bus architecture can further link various other circuits such as peripheral device, voltage regulator and power management circuit, which are all well known in the art and thus will not be further described again herein. The bus interface provides an interface. The transceiver 1010 can be a plurality of elements, i.e., include a transmitter and a receiver, and provide the units for communicating with various other devices over the transmission media. The processor 1000 is responsible for managing the bus architecture and general processing, and the memory 1020 can store the data used by the processor 1000 when performing the operations.

Figure 11:
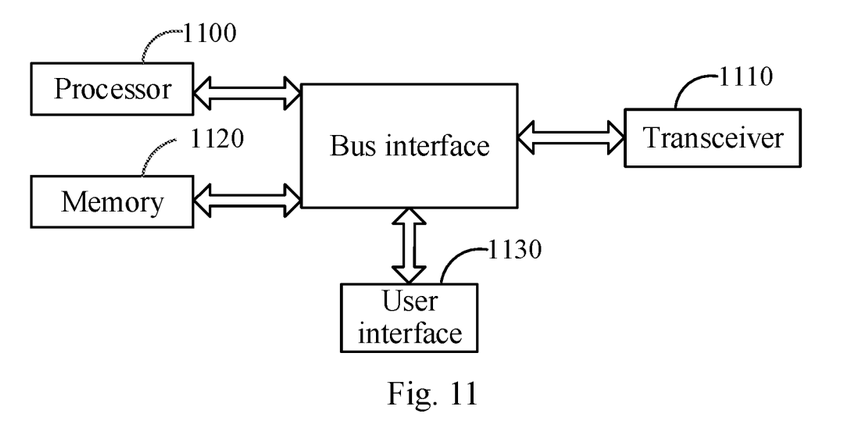
FIG. 11 is a structural schematic diagram of a terminal in an embodiment of the present application.

FIG. 11 is a structural schematic diagram of a terminal, and as shown, the terminal includes: a processor 1100 configured to read the programs in a memory 1120 to perform the process of: processing the data according to the transceiver requirement; a transceiver 1110 configured to receive and transmit the data under the control of the processor 1100 to perform the processes of: receiving the configuration for duplication transmission performed at the network side, where the configuration is performed at the network side for each radio bearer of a terminal; performing the duplication transmission according to the configuration.

In an implementation, the terminal receives the RRC signalling from the network side and determines the configuration for duplication transmission.

In an implementation, the configuration for duplication transmission includes one or a combination of: RB ID, and the configuration of the PDCP entity corresponding to the bearer; two corresponding Logical Channel Identity, LCID, used by the radio bearer for the duplication transmission, and the configurations of the RLC entities corresponding to the two logical channels respectively; for uplink transmission, the initial states configured for the two logical channels being whether to be in the activated state immediately after the configuration; for uplink transmission, the configuration for the radio bearer being whether to allow to activate or deactivate the duplication transmission.

In an implementation, the terminal receives the MAC layer signalling for activating or deactivating the duplication transmission from the network side.

In an implementation, the MAC layer signalling for activation or deactivation is an independent MAC subheader without MAC layer load.

In an implementation, the field in the MAC subheader is used to indicate that the MAC CE is used to activate or deactivate the duplication transmission.

In an implementation, the LCID field in the MAC subheader is used to indicate that the MAC CE is used to activate or deactivate the duplication transmission, and another field indicates whether to activate or deactivate specifically, wherein one LCID value is used to indicate that the MAC CE is the MAC CE for activating or deactivating the duplication transmission, and different values of the CE Type field are used to indicate that the MAC CE is the MAC CE for activating the duplication transmission or the MAC CE for deactivating the duplication transmission; or the LCID field in the MAC subheader is used to indicate that the MAC CE is used to activate or deactivate the duplication transmission, wherein two LCID values are used to indicate the MAC CE for activating the duplication transmission and the MAC CE for deactivating the duplication transmission respectively.

Here, in FIG. 11, the bus architecture can include any numbers of interconnected buses and bridges, and specifically link various circuits of one or more processors represented by the processor 1100 and the memory represented by the memory 1120. The bus architecture can further link various other circuits such as peripheral device, voltage regulator and power management circuit, which are all well known in the art and thus will not be further described again herein. The bus interface provides an interface. The transceiver 1110 can be a plurality of elements, i.e., include a transmitter and a receiver, and provide the units for communicating with various other devices over the transmission media. For different user equipments, the user interface 1130 can also be the interface capable of inter-connecting or exter-connecting with the required devices, and the connected devices include but not limited to keypad, display, loudspeaker, microphone, joystick and the like.

The processor 1100 is responsible for managing the bus architecture and general processing, and the memory 1120 can store the data used by the processor 1100 when performing the operations.

To sum up, in the technical solutions provided by embodiments of the present application, the duplication transmission (duplication) configuration is performed at the network side for each radio bearer of the terminal, where the configuration content includes the initial state of the duplication transmission, whether to allow to activate and deactivate.

Specifically, the transmitter activates or deactivates the PDCP PDU duplication transmission autonomously through the reception feedback of the underlying data packet.

Through the duplication transmission configuration, the services transmitted by the terminal repeatedly may include three types: the initial state is activated, and the activation or deactivation may be performed by the underlying signalling (MAC CE, MAC control element); the initial state is deactivated, and the activation or deactivation may be performed by the underlying signalling (MAC CE, MAC control element); the initial state is activated, and once being configured, the duplication transmission remains activated, and the underlayer is not allowed to activate or deactivate the duplication transmission.

An embodiment of the present application provides a readable storage medium, which is a non-volatile storage medium and includes the program codes which are configured, when running on a computing device, to cause the computing device to perform the actions of the base station described above.

An embodiment of the present application provides a readable storage medium, which is a non-volatile storage medium and includes the program codes which are configured, when running on a computing device, to cause the computing device to perform the actions of the terminal described above.

Embodiments of the present application provide a configuration and validation mechanism of the uplink duplication transmission, with which the duplication transmission can be applied flexibly for different bearer characteristics, and the utilization efficiency of the radio resources can be increased to avoid the resource waste while the high reliability caused by the duplication transmission is obtained. Meanwhile the control signalling overhead of the air interface is also saved.

It should be understood by those skilled in the art that embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

I claim:

1. A configuration method of duplication transmission, comprising:
   determining each radio bearer of a terminal; and
   performing a duplication transmission configuration for each radio bearer;
   wherein the duplication transmission configuration performed for each radio bearer comprises:
   a Radio Bearer Identity, RB ID, and a configuration of a PDCP entity corresponding to the bearer;
   two corresponding Logical Channel Identity, LCID, used by the radio bearer for the duplication transmission, and configurations of RLC entities corresponding to two logical channels respectively;
   for uplink transmission, configuring initial states of the two logical channels as whether to be in an activated state immediately after the configuration; and
   for uplink transmission, a configuration as to whether to allow to activate or deactivate the duplication transmission.

2. The method of claim 1, wherein the duplication transmission configuration is performed for each radio bearer using an RRC signalling.

3. The method of claim 1, wherein the duplication transmission of the radio bearer is activated or deactivated using an MAC layer signalling.

4. The method of claim 3, wherein the MAC layer signalling for activation or deactivation is an independent MAC subheader without MAC layer load.

5. The method of claim 4, wherein a field in the MAC subheader is used to indicate that an MAC CE is used to activate or deactivate the duplication transmission.

6. The method of claim 5, wherein an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or
   an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

7. A duplication transmission method, comprising:
   receiving, by a terminal, a configuration for duplication transmission performed at a network side, wherein the configuration is performed at the network side for each radio bearer of the terminal; and
   performing the duplication transmission according to the configuration;
   wherein the configuration for duplication transmission comprises:

a Radio Bearer Identity, RB ID, and a configuration of a PDCP entity corresponding to the bearer;

two corresponding Logical Channel Identity, LCID, used by the radio bearer for the duplication transmission, and configurations of RLC entities corresponding to two logical channels respectively;

for uplink transmission, initial states configured for the two logical channels being whether to be in an activated state immediately after the configuration; and for uplink transmission, a configuration for the radio bearer being whether to allow to activate or deactivate the duplication transmission.

8. The method of claim 7, wherein the terminal receives an RRC signalling from the network side and determines the configuration for duplication transmission.

9. The method of claim 7, wherein the terminal receives an MAC layer signalling for activating or deactivating the duplication transmission from the network side.

10. The method of claim 9, wherein the MAC layer signalling for activation or deactivation is an independent MAC subheader without MAC layer load.

11. The method of claim 10, wherein a field in the MAC subheader is used to indicate that an MAC CE is used to activate or deactivate the duplication transmission.

12. The method of claim 11, wherein an LCID field in the MAC subheader is used to indicate that the MAC CE is used to activate or deactivate the duplication transmission, and another field indicates whether to activate or deactivate specifically, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or an LCID field in the MAC subheader is used to indicate that the MAC CE is used to activate or deactivate the duplication transmission, wherein two LCID values are used to indicate an MAC CE for activating the duplication transmission and an MAC CE for deactivating the duplication transmission respectively.

13. A configuration device of duplication transmission, comprising:

a processor configured to read a program in a memory to perform a process of:

determining each radio bearer of a terminal;

a transceiver configured to receive and transmit data under control of the processor to perform a process of:

performing a duplication transmission configuration for each radio bearer;

wherein the processor is further configured to perform, for each radio bearer, the duplication transmission configuration comprising:

a Radio Bearer Identity, RB ID, and a configuration of a PDCP entity corresponding to the bearer;

two corresponding Logical Channel Identity, LCID, used by the radio bearer for the duplication transmission, and configurations of RLC entities corresponding to two logical channels respectively;

for uplink transmission, configuring initial states of the two logical channels as whether to be in an activated state immediately after the configuration; and for uplink transmission, a configuration as to whether to allow to activate or deactivate the duplication transmission.

14. The device of claim 13, wherein the processor is further configured to perform the duplication transmission configuration for each radio bearer using an RRC signalling.

15. The device of claim 13, wherein the processor is further configured to activate or deactivate the duplication transmission of the radio bearer using an MAC layer signalling.

16. The device of claim 15, wherein the processor is further configured to use the MAC layer signalling that is an independent MAC subheader without MAC layer load for activation or deactivation.

17. The device of claim 16, wherein the processor is further configured to use a field in the MAC subheader to indicate that an MAC CE is used to activate or deactivate the duplication transmission.

18. The device of claim 17, wherein the processor is further configured to use an LCID field in the MAC subheader to indicate that the MAC CE is used to activate or deactivate the duplication transmission, and use another field to indicate whether to activate or deactivate, wherein one LCID value is used to indicate that the MAC CE is an MAC CE for activating or deactivating the duplication transmission, and different values of a CE Type field are used to indicate that the MAC CE is an MAC CE for activating the duplication transmission or an MAC CE for deactivating the duplication transmission; or, to use an LCID field in the MAC subheader to indicate that the MAC CE is used to activate or deactivate the duplication transmission, wherein two LCID values are used to indicate an MAC CE for activating the duplication transmission and an MAC CE for deactivating the duplication transmission respectively.

19. A duplication transmission device, comprising:

a processor configured to read a program in a memory to perform a process of:

processing data according to a transceiver requirement;

a transceiver configured to receive and transmit data under control of the processor to perform the method according to claim 7.

20. The device of claim 19, wherein the processor is further configured to receive an RRC signalling from the network side and determine the configuration for duplication transmission.

* * * * *